Nov. 10, 1953 G. BANISTER ET AL 2,658,342
HYDRAULIC DRIVE SYSTEM
Filed May 29, 1951 4 Sheets-Sheet 1
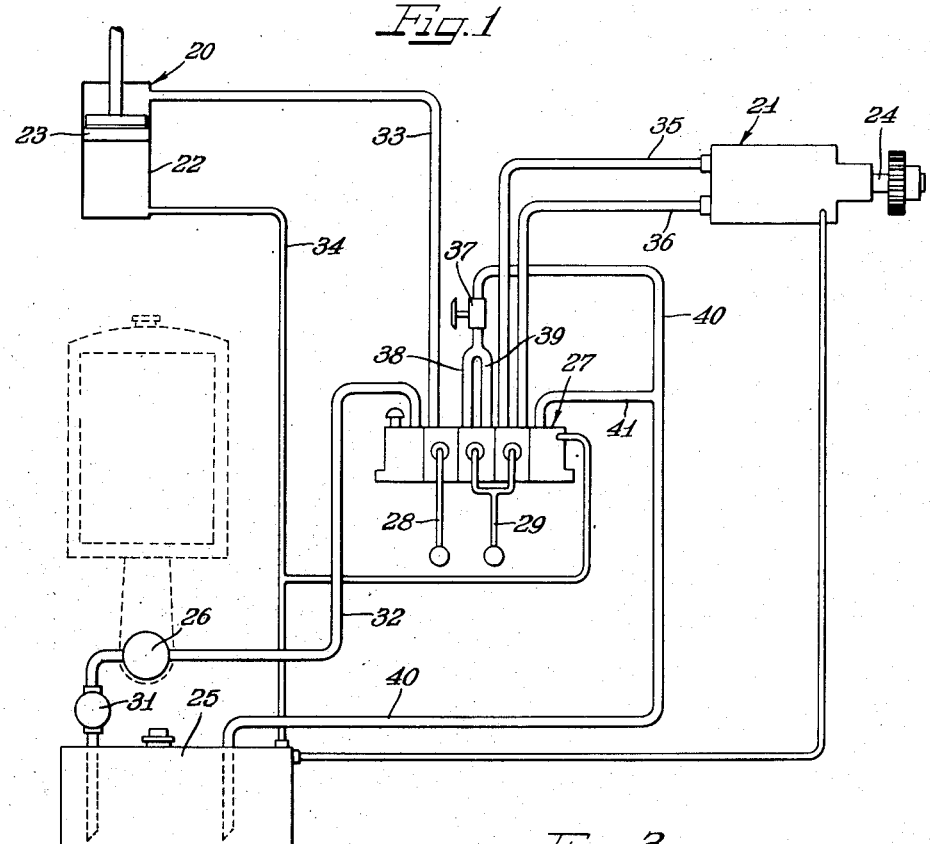
*Fig. 1*
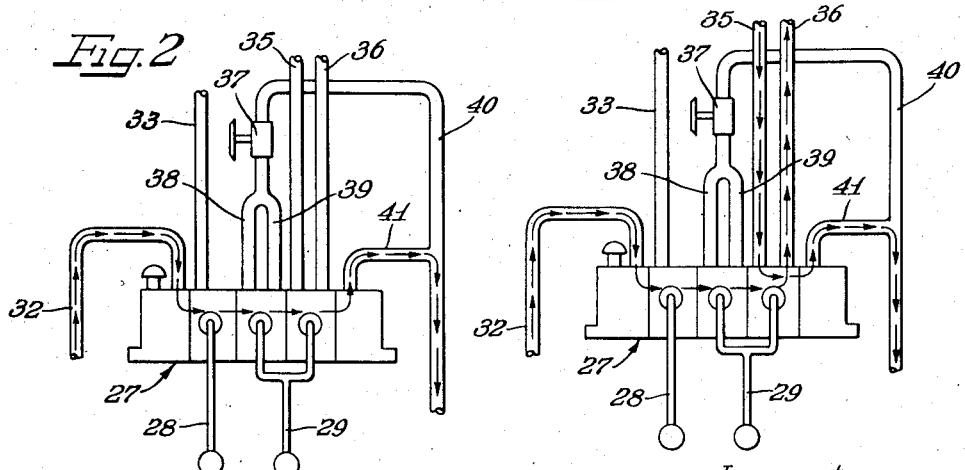
*Fig. 2* *Fig. 3*
Inventor
Guy Banister
Leonard Stephen Burns Inventor
Guy Banister
Leonard Stephen Burns
by Hill, Sherman, Meroni, Gross & Simpson Attys Nov. 10, 1953  G. BANISTER ET AL  2,658,342
HYDRAULIC DRIVE SYSTEM
Filed May 29, 1951  4 Sheets-Sheet 3
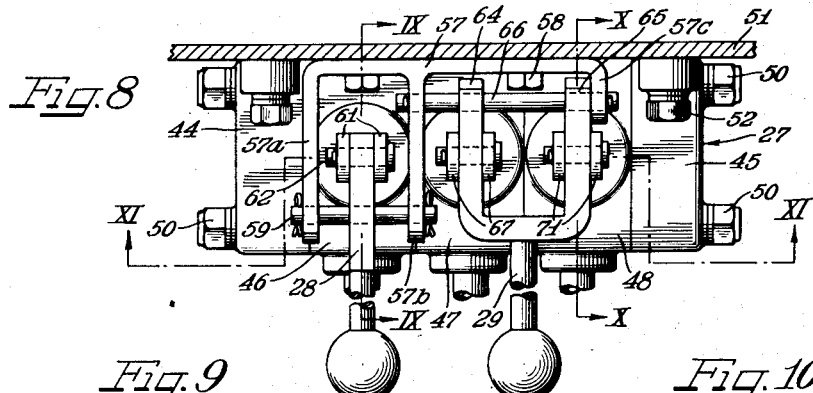
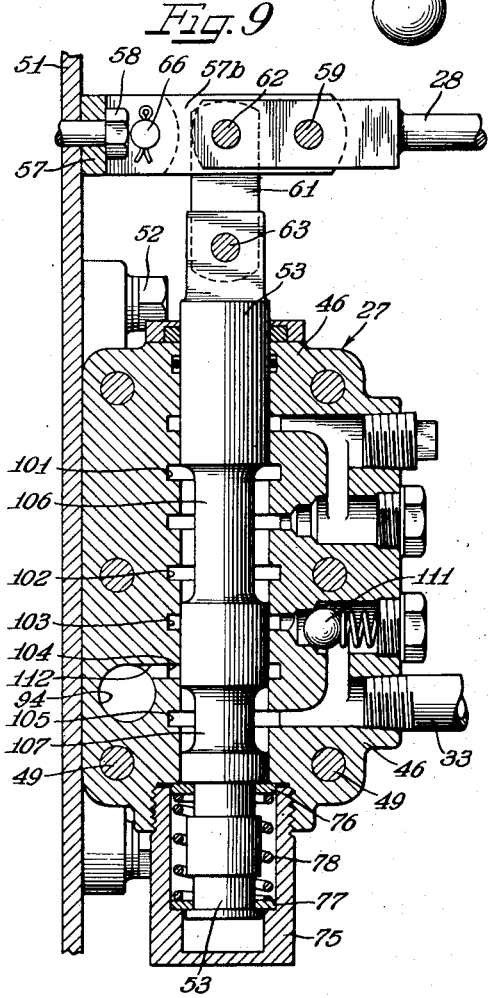
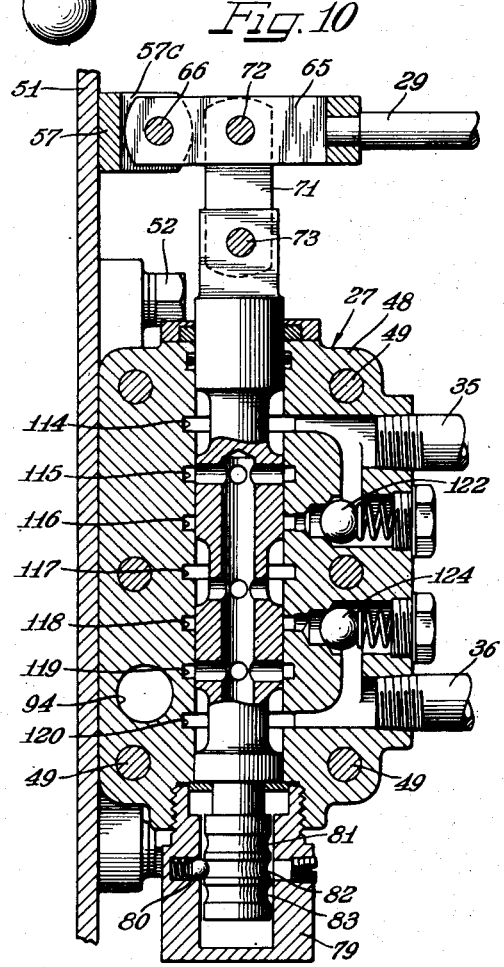
Inventor
Guy Banister
Leonard Stephan Burns
by Hill, Sherman, Meroni, Gross & Simpson Attys

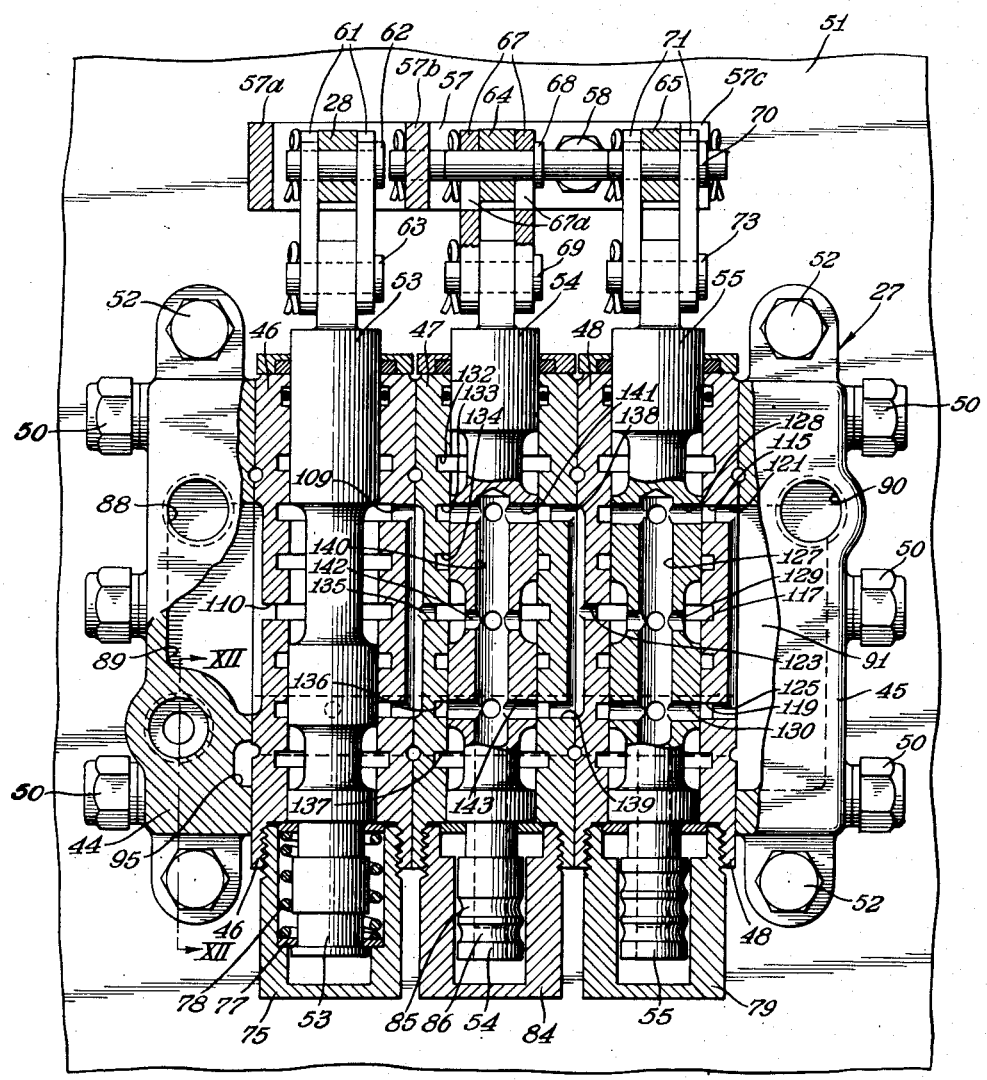

Patented Nov. 10, 1953

2,658,342

UNITED STATES PATENT OFFICE 2,658,342

HYDRAULIC DRIVE SYSTEM

Guy Banister and Leonard Stephen Burns, Aurora, Ill., assignors to Barber-Greene Company, Aurora, Ill., a corporation of Illinois Application May 29, 1951, Serial No. 228,812

5 Claims. (Cl. 60—52)

This invention relates to a hydraulic drive system and more particularly to a hydraulic control system for one or more hydraulic motors which is adapted for various applications.

An object of this invention is to provide an improved control system for a hydraulic motor in which an adjustable valve is provided for bypassing a portion of the fluid under pressure supplied to the motor, the fluid flow to the motor being continuously variable within limits by adjustment of the valve.

Another object of this invention is to provide an improved control system for a plurality of hydraulic motors utilizing a multi-valved and passaged unit, the unit having a relief valve incorporated therein for limiting the fluid pressure supplied to the motors.

A further object of this invention is to provide an improved control system for a pair of hydraulic motors in which a multi-valved and passaged unit has a separate control for each of the motors, the fluid flow to one of the motors being blocked off when the control for the other motor is in a feed position.

Still another object of this invention is to provide an improved control system for a hydraulic motor in which a control may be set for either forward or reverse operation of the motor and in which means are provided for adjusting the forward speed of the motor, the speed adjustment means being inoperable in the reverse setting of the control.

A still further object of this invention is to provide an improved control system for a hydraulic motor in which a valve controls fluid flow to the motor, the control valve being selectively operable to forward and reverse positions and to a neutral position in which fluid conduits to the motor are blocked off so that the motor may act as a brake.

The hydraulic drive system of this invention includes a pair of hydraulic motors and control means therefor. The motors may be used in any machine or for any application where actuation of elements inter-related in operation is desired. The motors may be of any desired type, having either reciprocable or rotatable fluid actuated elements. It will, of course, be understood that the principles of this invention can be applied to hydraulic drive systems using any number of motors.

The hydraulic system includes a fluid reservoir, a pump and a multi-valved and passaged unit having a separate control for each of the hydraulic motors. An important feature of this invention is in the provision of a valve for bypassing fluid from the motor, the valve being adjustable so that the speed of the motor may be adjusted with infinite possible variations within limits.

Another feature of this invention relates to reverse and forward operation of one of the motors. By this invention the control of one of the motors is selectively movable to forward, reverse and neutral positions. In the forward position of the control, the by-pass valve is operable for controlling the speed of the motor while in the reverse position of the control, the by-pass valve is inoperable so that the speed in reverse is fixed regardless of the adjusted setting of the by-pass valve. Also, with the control in the neutral position, the conduits to the motor are blocked off so that the motor may act as a brake.

Other objects, features and advantages of the present invention will become more fully apparent from the following detailed description taken in conjunction with the accompanying drawings which illustrate a preferred embodiment of the invention and in which:

Figure 1 is a view illustrating diagrammatically the hydraulic drive system of the present invention including hydraulic motors, a pump, a reservoir and a control unit;

Figure 2 is a view illustrating diagrammatically the flow in the hydraulic system with the controls for both hydraulic motors in neutral positions;

Figure 3 is a view illustrating diagrammatically the flow through the hydraulic system with the control for one motor in a neutral position and with the control for the other motor in a reverse position;

Figure 8 is a top plan view of the control valve unit;

Figure 9 is a sectional view, on an enlarged scale, taken substantially along lines IX—IX of Figure 8;

Figure 10 is a sectional view, on an enlarged scale, taken substantially along lines X—X of Figure 8;

Figure 11 is a sectional view, on an enlarged scale, taken substantially along lines XI—XI of Figure 8; and Figure 12 is a sectional view taken substantially along lines XII—XII of Figure 11.

Figure 4:
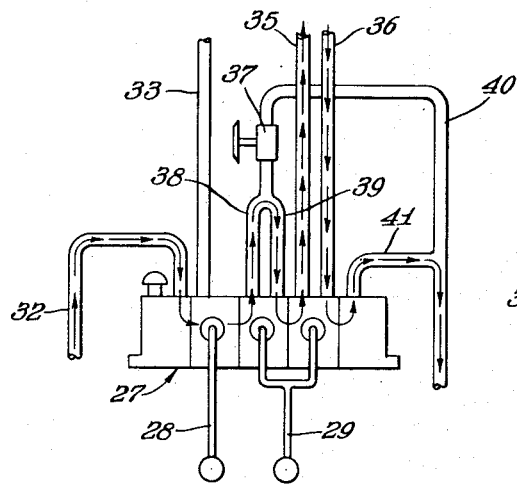
Figure 4 is a view similar to Figures 2 and 3 illustrating the flow in the hydraulic system with the control for one motor in a neutral position and the control for the other motor in a forward feed position.

Referring to Figure 1, the hydraulic drive system of this invention may include a pair of hydraulic motors generally designated by reference numerals 20 and 21. The hydraulic motor 20 herein comprises a cylinder 22 and a piston 23 reciprocably movable in the cylinder. Means, not shown, are preferably provided for biasing the piston 23 upwardly. The hydraulic motor 21 is herein a reversible rotating type having an output shaft 24. It will be understood that either of the motors 20 and 21 may be either a reciprocable type or a rotating type. It will be further understood that the principles of this invention can be applied to any number of hydraulic motors in a drive system.

The hydraulic motors 20 and 21 may be used to actuate elements in any desired apparatus. By way of example, the motors may be used in a ditching machine wherein the hydraulic motor 20 may be used to control the raising and the lowering of a boom carrying a digging bucket line thereon and the hydraulic motor 21 may be used to actuate the traction means of the digging machine.

The hydraulic system which actuates the hydraulic motors 20 and 21 includes a fluid reservoir or tank 25, an engine-driven pump 26 and a control unit generally designated by reference numeral 27. The construction of the control unit 27 will be described in detail hereinafter, but in general, it is a multi-valved and passaged unit having a lever 28 controlling the hydraulic motor 20 and a lever 29 controlling the hydraulic motor 21.

The inlet side of the pump 26 is connected to the reservoir 25 through a strainer 31. The outlet side of the pump 26 is connected to the control unit 27 through a conduit 32. The upper end of the cylinder 22 is connected to the control unit 27 through a conduit 33 and the lower end of the cylinder 22 is connected to the reservoir 25 through a conduit 34. The hydraulic motor 21 is connected to the control unit 27 through a pair of conduits 35 and 36. An adjustable valve 37 is provided for by-passing fluid from the hydraulic motor 21 in one position of the control lever 29. The by-pass valve 37 is connected to the control unit 27 through a pair of conduits 38 and 39 and is connected to the reservoir 25 through a conduit 40. A conduit 41 is connected to the control unit 27 and joins the conduit 40 for flow of fluid from the control unit 27 to the reservoir 25.

Figures 2, 3, 4, 5, 6 and 7 illustrate diagrammatically the flow in the hydraulic system in various positions of the control levers 28 and 29 of the control unit 27.

Figure 2 illustrates the flow when the control levers 28 and 29 are both in neutral positions. This flow will be from the pump 26 through conduit 32 to the control unit 27 and out through conduits 41 and 40 to the reservoir 25.

Figure 3 illustrates the flow when the control lever 28 is in a neutral position and the control lever 29 is in a reverse feed position. This flow will be from the pump 26 through conduit 32 to the control valve unit 27, out through conduit 36 to the hydraulic motor 21, back through conduit 35 to the control unit 27, out through conduit 41, and back through conduit 40 to the reservoir tank 25.

Figure 4 illustrates the flow with the control lever 28 in neutral position, the control lever 29 in a forward feed position and with the by-pass valve 37 closed. This flow will be from the pump 26 through conduit 32 to the control unit 27, out through conduit 38, back through conduit 39 to the control unit 27, out through conduit 35 to the hydraulic motor 21, back through conduit 36 to the control unit 27, out through conduit 41, and back through conduit 40 to the reservoir tank 25.

Figure 5:
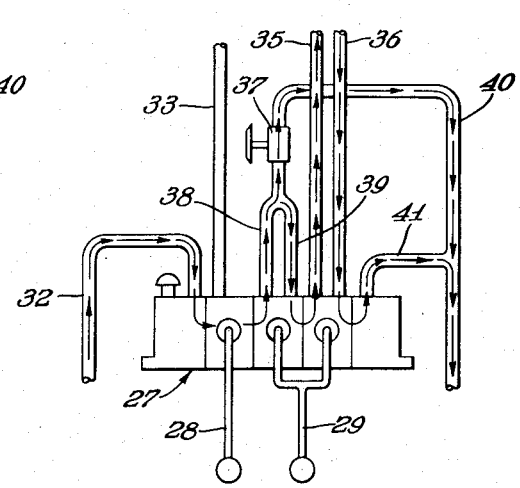
Figure 5 is a view illustrating the flow with the controls in the same position as Figure 4 except that the by-pass valve is open for adjustment of the forward speed of the one motor.

Figure 5 illustrates the flow of the hydraulic system with the control lever 28 in neutral position, the control lever 29 in forward feed position and with the by-pass valve 37 at least partially open, that is, with the levers 28 and 29 in the same position as in Figure 4 but with the by-pass valve 37 at least partially open. This flow will be from the pump 26 through conduit 32 to the control unit 27, out through conduit 38 where the flow divides, a portion of the flow being through the by-pass valve 37 back through conduit 40 to the reservoir tank 25 and the remaining portion of the flow being back through conduit 39 to the control unit 27, out through conduit 35 to the hydraulic motor 21, back through conduit 36 to the control unit 27, out through conduit 41, and back through conduit 40 to the reservoir tank 25.

It will be noted that with the levers 28 and 29 in the positions of Figures 4 and 5, the flow through the conduits 35 and 36 which feed the hydraulic motor 21 will be the reverse of the flow through conduits 35 and 36 in the position of the levers of Figure 3. It may also be noted that the by-pass valve 37 may be adjusted to control the fluid pressure applied to the hydraulic motor 21, and hence the speed of the motor. In the reverse feed position of the lever 29 as illustrated in Figure 3, however, the by-pass valve 37 will be blocked off so that the full output pressure of the pump 26 will be applied to the hydraulic motor 21 and the motor operated at full speed reverse regardless of the setting of by-pass valve 37.

Figure 6:
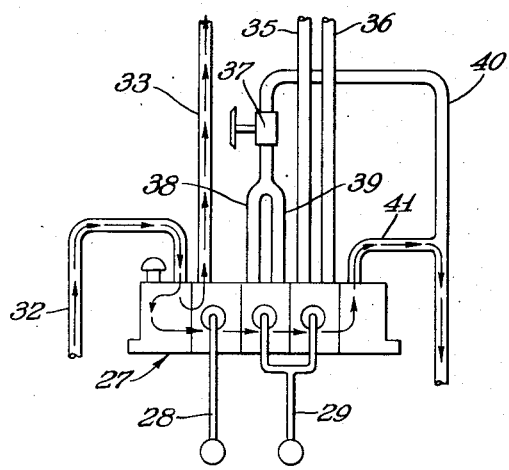
Figure 6 is a view illustrating diagrammatically the flow in the hydraulic system with one control in a feed position and the other control in a neutral position, this view also illustrating flow through the relief valve incorporated in the control unit.

Figure 6 illustrates the flow in the hydraulic system with the lever 28 in feed position and with the lever 29 in neutral position. In this position of the controls, fluid will flow from the pump 26 through conduit 32 to the control unit 27 and out through conduit 33 to the upper portion of the cylinder 22 to urge the piston 23 downwardly against a biasing force preferably acting thereon. Fluid in the lower portion of the cylinder 22 may, of course, flow through the conduit 34 to the reservoir tank 25. Figure 6 also illustrates flow that may take place through a relief valve in the control unit 27 out through conduit 41 and back through conduit 40 to the tank 25. This flow will take place whenever the fluid pressure from the pump 26 exceeds a predetermined value and may, for example, take place when the movement of the piston 23 is blocked.

Figure 7:
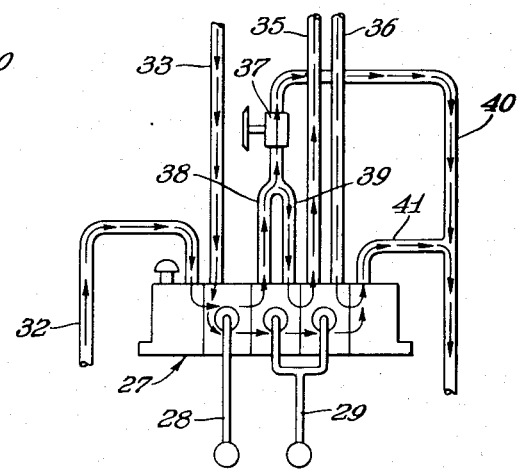
Figure 7 is a view illustrating diagrammatically the flow in the hydraulic system with one control in a retract position and with the other control in the forward feed position and with by-pass valve adjusted to be at least partially open to reduce the speed of the motor.

Figure 7 illustrates the flow in the hydraulic system when the lever 28 is in a retract position and also illustrates the flow that may take place with the lever 29 in forward feed position. In this position of the control lever 28, the piston 23 may be moved upwardly by a biasing force to force fluid from the upper portion of the cylinder 22 through the conduit 33 to the control unit 27, out through conduit 41, and back through conduit 40 to the tank 25. Simultaneously, fluid may flow from the pump 26 through conduit 38 to a point where the flow divides, a portion of the flow being through the by-pass valve 37 and back through conduit 40 to the tank 25 and the remaining portion of the flow back through conduit 39 to the control unit 27, out through conduit 35 to the motor 21, back through conduit 36 to the control unit 27, out through conduit 41 and back through conduit 40 to the tank 25. It may be noted that with the lever 28 in the retract position, as in Figure 7, the motor 21 may be actuated, but when the lever 28 is in the feed position, as in Figure 6, the motor 21 is blocked off and cannot be actuated.

The control unit 27 is illustrated in detail in Figures 8, 9, 10, 11 and 12. Referring thereto, the unit 27 includes a pair of end caps 44 and 45 between which three valve body sections 46, 47 and 48 are disposed. The end caps 44 and 45 and the valve body sections 46, 47 and 48 are secured in assembly by tie bolts 49 and nuts 50. The assembly 27 may be secured to a portion 51 of the machine with which used by bolts or screws 52.

Three plungers 53, 54 and 55 are slidably disposed in the valve body section 46, 47 and 48, respectively. The position of plunger 53 may be adjusted and controlled by the control lever 28 and the positions of plungers 54 and 55 may be adjusted and controlled by the lever 29. For this purpose a bracket 57 having projecting arm portions 57a, 57b and 57c is secured to the portion 51 by means of bolts or screws 58. The lever 28 is pivotally disposed on a pin 59 extending between the portions 57a and 57b of the bracket 57 and the end portion of the lever 28 is connected to the plunger 53 by means of a pair of links 61, a pin 62 extending through the links and the end portion of the lever 28 and a pin 63 extending through the links 61 and the upper end portion of the plunger 53.

The lever 29 is bifurcated at its inner end to form spaced parallel portions 64 and 65, the lever 29 being pivoted to the bracket 57 by means of a pin 66 extending through the arm portions 57b and 57c and through the inner end portions of the legs 64 and 65. The leg 64 is connected to the plunger 54 by means of a pair of links 67, a pin 68 securing the links to the leg 64 and a pin 69 securing the links 68 to the upper portion of the plunger 54. It may be here noted that, as shown in Figure 11, each link 67 has a longitudinal slot 67a through which the pin 68 extends so that a lost-motion connection is provided between the lever 29 and the plunger 54. This lost-motion connection is for a purpose which will appear hereinafter.

The leg 65 of the lever 29 is connected to the plunger 55 by means of a pair of links 71, a pin 72 securing the link 71 to the leg 65, and a pin 73 securing the links 71 to the upper end portion of the plunger 55.

The plunger 53 is resiliently urged into the neutral position illustrated in Figures 9 and 11. For this purpose a hollow cap 75 is threaded into the lower end of the valve body section 46 and extends over the lower end portion of the plunger 53. A ring 76 is disposed around the plunger 53 and is adapted to engage an annular abutment on the plunger 53 and an annular abutment in the valve body section 46. A similar ring 77 is adapted to engage an annular abutment on the plunger 53 and an annular abutment in the cap 75. Between the rings 76 and 77 is a helical compression spring 78 resiliently urging the ring 76 into engagement with the annular abutments of the plunger 53 and valve body section 46, and the ring 77 into engagement with the annular abutments in the cap 75 and plunger 53.

It will be seen that the plunger 53 can thus be moved up or down against the action of the compression spring 78 and will be returned to the neutral position illustrated in Figures 9 and 11 when released.

Means are provided for locking the plunger 55 into any one of three selected positions. A cap member 79 is threaded into the lower end of the valve body section 48 and extends over the lower end of the plunger 55. A spring-pressed ball detent 80 is mounted in the cap member 79 and is adapted to engage any one of three vertically spaced annular grooves 81, 82 and 83 in the lower end portion of the plunger 55 to lock the plunger in a selected vertical position.

Similar means are provided for locking the plunger 54 in either one of two selected positions. A cap member 84 is threaded into the lower ends of the valve body section 47. Mounted in the cap member 84 is a spring-pressed ball detent (not shown) which is adapted to engage either of two vertically spaced grooves 85 and 86 in the lower end portion of the plunger 54. Only two annular grooves are provided in the plunger 54 since, due to the lost-motion connection between the lever 29 and the plunger 54 described above, the plunger 54 will not be moved downwardly when the lever 29 is moved downwardly.

The end cap 44 has an opening 88 into which the conduit 32 from the pump 26 may be connected. The opening 88 extends into a chamber 89 which thus has fluid under pressure from the pump 26 therein. The end cap 45 has an opening 90 therein into which the conduit line 41 may be connected. This opening 90 extends into a chamber 91.

The valve body sections 46, 47 and 48 have aligned openings 94 therethrough (Figures 9 and 10) which communicate with a passage 95 in the end cap 44 and with the chamber 91 in the end cap 45. As best shown in Figure 12, the passage 95 in the end cap 44 communicates with a chamber 96 at one side of a spring-pressed relief valve member 97. A passage 98 extends from the other side of the relief valve member 97 to the chamber 89. It will be readily seen that when the pressure from the pump 26 is sufficient to overcome the spring pressure acting against the relief valve member 97, the fluid can flow from the chamber 89 through the passage 98, past the relief valve 97 into the chamber 96, through the passage 95, through the aligned opening 94 in the three valve body sections, to the chamber 91 in the end cap 45, out through the conduit 41, and back through conduit 40 to the reservoir tank 25. The relief valve 97 thus prevents blocking of the pump and damage thereto.

The relief valve 97 also limits the pressure which may be applied to the hydraulic motors 20 and 21. This is highly advantageous in many applications to which the hydraulic drive of this invention may be applied. For example, if the elements to which the piston 23 is connected in a particular machine are so designed that they cannot withstand more than a certain amount of actuating force, the relief valve 97 can be adjusted so that fluid pressure applied to the piston 23 is limited and so that the force applied by the piston 23 will not exceed the safe design limit.

Referring to Figures 9 and 11, the valve body section 46 has vertically spaced annular internal grooves 101, 102, 103, 104 and 105 surrounding the plunger 53. The plunger 53 has portions 106 and 107 of reduced diameter which, together with the internal surfaces of the valve body section 46, form fluid flow passageways. The annular groove 101 communicates with a passage 109 extending to the valve body section 47. The annular groove 102 communicates with the chamber 89 in the end cap 44 through a passage 110. As shown in Figure 9, the annular groove 103 communicates with the conduit 33 through a check valve including a spring-pressed ball 111. The annular groove 104 communicates through a passage 112 with the opening 94 which, as described above, communicates with the reservoir tank 25. The annular groove 105 communicates directly with the conduit 33 which is connected to the upper end of the hydraulic cylinder 22.

In the position of the plunger 53 illustrated in Figures 9 and 11, fluid may flow from the pump 26 through conduit 32 into the chamber 89 and from the chamber 89 through the passage 110 into the valve body section 46 and out through the passage 109 to the valve body section 47. The flow in the valve body sections 47 and 48 will control the operation of the hydraulic motor 21, as will be described later.

When the plunger 53 is moved downwardly from the positions illustrated in Figures 9 and 11, the fluid flow will be as diagrammatically illustrated in Figure 6. Fluid under pressure from the pump will flow from the chamber 89 through the passage 110 into the grooves 102 and 103 in the valve body section 46, and from the groove 103 past the spring-pressed ball 111 into the conduit 33 and to the upper portion of the cylinder 22 to force the piston 23 downwardly against the biasing force preferably acting upwardly thereon. In this downward position of the plunger 53 it will be noted that the annular internal groove 109 leading to the valve body section 47 will be closed off so that the hydraulic motor 21 cannot be actuated. This is highly advantageous in certain applications such as, for example, in machines where the hydraulic motor 21 drives the traction means and it is desired that the traction means be braked when the hydraulic motor 20 is actuated in one direction.

If the lever 28 is held up after the piston 23 has moved to the limit of its movement, fluid pressure building up in the chamber 89 will be released through the relief valve 97.

When the plunger 53 is moved upwardly from the neutral position illustrated in Figures 9 and 11, the piston 23 in the cylinder 22 will preferably be moved upwardly by a biasing force acting thereon and fluid will be forced out through the conduit 33 into the annular internal grooves 105 and 104, from groove 104 through the passage 112 into the opening 94, into the chamber 91, out through the conduit 41, and back through the conduit 40 to the reservoir tank 25.

It will be noted that in this upper position of the plunger 53, fluid under pressure from the pump may flow from the chamber 89, through the passage 110, and through the passage 109 through the valve body sections 47 and 48 so that the hydraulic motor 21 may be actuated. The flow through the control unit in this upper position of the plunger 53 is diagrammatically illustrated in Figure 7.

The fluid flow passages in the valve body sections 47 and 48 and in the plungers 54 and 55 are exactly the same, and for that reason a section (Figure 10) has been taken only through the valve body section 48. Referring to Figures 10 and 11, the valve body section 48 has vertically spaced internal annular grooves 114, 115, 116, 117, 118, 119 and 120 around the plunger 55. The groove 114 communicates directly with the conduit 35 which extends to the hydraulic motor 21. The annular groove 115 communicates through a passage 121 with the chamber 91 in the end cap 45. The annular groove 116 communicates with the conduit 35 through a check valve including a spring-pressed ball 122. The annular groove 117 communicates through a passage 123 with the valve body section 47. The annular groove 118 communicates through a check valve, including a spring-pressed ball 124, with the conduit 36 which is connected to the hydraulic motor 21. The internal annular groove 119 communicates through a passage 125 with the chamber 91 in the end cap 45. The annular groove 120 communicates directly with the conduit 36.

The plunger 55 has three vertically spaced reduced diameter portions which, together with opposing internal surface portions of the valve body section 48, form fluid flow passages. The plunger 55 also has an axially extending internal chamber 127 from which extends horizontal, vertically spaced passages 128, 129 and 130.

As indicated above, the fluid flow passages in the valve body section 47 and the plunger 54 are the same as those in the valve body section 48 and plunger 55. The valve body section 47 has vertically spaced internal annular grooves 132, 133, 134, 135, 136 and 137 around the plunger 54 which correspond with the internal grooves 114, 115, 116, 117, 119 and 120 of the valve body section 48.

The annular groove 132 communicates directly with the conduit 38 extending to the by-pass valve 37; the groove 133 communicates through a passage 138 with the passage 123 in the valve body section 48; the annular groove 134 communicates through a check valve (not shown) with the conduit 38 extending to the by-pass valve 37; the annular groove 135 communicates with the passage 109 in the valve body section 46; the annular groove 136 communicates through a passage 139 with the passage 123 in the valve body section 48; and the annular groove 137 communicates with the conduit 39 which extends to the by-pass valve 37.

The plunger 54 has an axially extending chamber 140 similar to the chamber 127 in the plunger 55. Extending from the chamber 140 are horizontal, vertically spaced passages 141, 142 and 143 similar to the passages 128, 129 and 130 in the plunger 55.

In the neutral positions of plungers 53, 54 and 55 illustrated in the drawings, fluid will flow as diagrammatically illustrated in Figure 2. In this case, fluid under pressure from the pump 26 may flow from the chamber 89 through the passage 110 in the valve body section 46, through the passage 109 through the valve body section 47, through passage 142 into the internal chamber 140 in the plunger 54, out through passages 141 and 143 into passages 138 and 139, respectively, in the valve body section 47, through passage 135 into the valve body section 48, through passage 129 into the internal chamber 127 in the plunger 55, out through passages 128 and 130 to the passages 121 and 125, respectively, to the chamber 91 in the end cap 45, out through conduit 41, and back through conduit 40 to the reservoir tank 25.

It will be noted that with the levers 28 and 29 in the neutral positions thereof, both hydraulic motors 20 and 21 will be blocked off and locked in position so as to act as brakes on elements that may be connected thereto.

When the lever 28 is in its neutral position and the lever 29 is moved downwardly, the fluid flow in the hydraulic system will be as diagrammatically illustrated in Figure 3. Due to the lost-motion connection between lever 29 and plunger 54, the plunger 54 will not be moved downwardly by downward movement of the lever 29, but the plunger 55 will be moved to its downward position.

In this position of the controls, the fluid flow in the valve body sections 46 and 47 will be as described above and fluid under pressure from the pump will flow through the passage 123 in the valve body section 48, into the annular grooves 117 and 118 and from the groove 118 past the spring-pressed ball 124, out through conduit 36 to the hydraulic motor 21, back through conduit 35 into the annular grooves 114 and 115, and from annular groove 115 through passage 121 into the chamber 91 in the end cap 45, out through conduit 41, and back through conduit 40 to the reservoir tank 25.

It will be noted that in this downward or reverse feed position of the lever 29, the conduits 38 and 39 leading to the by-pass valve 37 are blocked off since the plunger 54 is in its neutral position. Thus, the hydraulic motor will have the full fluid pressure of the pump 26 applied thereto.

When the lever 28 is in its neutral position and the lever 29 is moved upwardly, both the plunger 54 and the plunger 55 will be moved upwardly. The fluid flow in this instance will be as diagrammatically illustrated in Figures 4 and 5. Since the plunger 53 is in a neutral position, fluid under pressure from the pump will appear at the passage 109 in the valve body section 46 and will flow into the grooves 135 and 134 and from groove 134 out past a check valve (not shown) to the conduit 38 toward the by-pass valve 37 where the flow divides, a portion of the flow being through the by-pass valve 37 and back through the conduit 40 to the reservoir tank 25 and the remaining portion of the flow being back through the conduit 39 into internal annular grooves 137 and 136 in the valve body section 47 and from groove 136 through passage 139 in the valve body section 47 into passage 123 in the valve body section 48, into internal grooves 117 and 116, out from groove 116 past the spring-pressed ball 122 through the conduit 35 to the hydraulic motor 21, back through conduit 36 into the annular grooves 120 and 119 in the valve body section 48, from groove 119 through passage 125 to the chamber 91 in the end cap 45, out through conduit 41, and back through conduit 40 to the reservoir tank 25.

It will be apparent that in this upward or forward feed position of the lever 29, the amount of fluid by-passed through the valve 37 and consequently the fluid pressure applied to the hydraulic motor 21 will depend upon the adjusted position of the by-pass valve 37.

In summary, with the hydraulic control system of this invention as described in detail, the two hydraulic motors are separately controlled from the single control unit and the flow to one of the motors may be blocked off when the control for the other motor is in a feed position. An adjustable valve is provided in the hydraulic system to by-pass fluid from one of the hydraulic motors so as to control the fluid pressure applied thereto and consequently the actuation speed thereof. Provision is made in the control unit so that the by-pass valve is operable in one position of the hydraulic motor control but is inoperable in a reverse position of the control so that, for example, the forward speed of the motor may be readily controlled but the motor can be quickly reversed and operated at full speed reverse regardless of the forward speed setting of the by-pass valve.

In addition, a relief valve is incorporated in the control unit to limit the fluid pressure applied to the hydraulic motors, which is highly advantageous when the torque or force which the elements or linkage to which the motors are connected can withstand, is limited.

Further, when the controls are moved to the neutral positions thereof, fluid flow to the respective motors is blocked off so as to hydraulically lock the motors in position and so that operation of separate brakes is not necessary.

Thus, there is here provided a hydraulic drive system which is readily controlled to obtain desired operating conditions, which is readily constructed and assembled and which is reliable in operation.

It will be understood that modifications and variations may be effected without departing from the spirit and scope of the novel concepts of the present invention.

We claim as our invention:

1. For use in a machine having a pair of hydraulic motors actuating elements interrelated in operation, a hydraulic control system comprising: a multi-valved and passaged unit for connection to said hydraulic motors; means for supplying fluid under pressure to said unit; first manually operable means on said unit selectively movable between a feed position permitting fluid flow to one of said motors and a neutral position; second manually operable means on said control unit selectively movable between a feed position permitting fluid flow in one direction through the other of said motors and a reverse speed position permitting fluid flow in the reverse direction through said other of said motors; adjustable valve means by-passing fluid from said other of said motors in only the forward speed position of said second manually operable means; fluid flow through said control unit to said other of said motors being blocked off in the feed position of said first manually operable means.

2. In a hydraulic system having a hydraulic motor, a supply of fluid under pressure and an adjustable valve for by-passing of fluid from said motor, a control unit comprising first and second passaged valve body sections, each section having a valve member movable therein, means connecting said by-pass valve to said first section, means connecting said hydraulic motor to the other of said sections, and a single control member connected to said valve members and selectively movable between a forward feed position in which said by-pass valve is operable to control the fluid pressure applied to said motor and a reverse feed position in which said by-pass valve is blocked off and the full fluid pressure of the system applied to said motor.

3. In a hydraulic drive system including a pair of hydraulic motors, a fluid reservoir, a pump, an adjustable valve, a multi-valved and passaged control unit and conduits operably connecting the same, first manually operable means in said control unit for controlling one of said motors, and second manually operable means for controlling the other of said motors; said first manually operable means being selectively and adjustably movable between a feed position permitting application of fluid under pump pressure to said one motor and and blocking fluid flow to said other motor, a neutral position braking said one motor and permitting fluid flow to said other motor and a retract position permitting free movement of said one motor and permitting fluid flow to said other motor; and said second manually operable means being selectively movable between a forward feed position permitting application of fluid under pump pressure to said other motor and permitting by-passing of fluid under pump pressure from said other motor to said reservoir through said adjustable valve and a reverse feed position permitting flow of fluid under pump pressure through said other motor in a reverse direction and blocking off fluid flow through said adjustable by-pass valve.

4. In a hydraulic system having a hydraulic motor, a supply of fluid under pressure and a control valve for controlling fluid flow through said motor, a control unit comprising first and second passage valve body sections, each section having a valve member movable therein, means connecting said control valve to said first section, means connecting said hydraulic motor to the other of said sections, and a control member connected to said valve members and selectively movable between a forward feed position in which said control valve is operable to control the fluid flow through said motor and a reverse feed position in which said control valve is blocked off and the full fluid pressure of the system applied to said motor.

5. In a hydraulic drive system including a pair of hydraulic motors, a fluid reservoir, a pump, an adjustable valve, a multi-valved and passaged control unit and conduits operably connecting the same, first manually operable means in said control unit for controlling one of said motors, and second manually operable means for controlling the other of said motors; said first manually operable means being selectively and adjustably movable between a feed position permitting application of fluid under pump pressure to said one motor and blocking fluid flow to said other motor, a neutral position braking said one motor and permitting fluid flow to said other motor and a retract position permitting free movement of said one motor and permitting fluid flow to said other motor; and said manually operable means being selectively movable between a forward feed position permitting flow of fluid under pump pressure through said other motor and through said adjustable valve to said reservoir and a reverse feed position permitting flow of fluid under pump pressure through said other motor to said reservoir in a reverse direction with said adjustable valve inoperable to control fluid flow.

GUY BANISTER.
LEONARD STEPHEN BURNS.

References Cited in the file of this patent

UNITED STATES PATENTS

| Number | Name | Date |
|---|---|---|
| 2,160,596 | LeBleu | May 30, 1939 |
| 2,192,778 | Stacy | Mar. 5, 1940 |
| 2,247,140 | Twyman | June 24, 1941 |
| 2,247,141 | Twyman | June 24, 1941 |
| 2,489,435 | Robinson | Nov. 29, 1949 |
| 2,527,943 | Lee | Oct. 31, 1950 |
| 2,586,932 | Gardiner et al. | Feb. 26, 1952 |